United States Patent [19]

De Cock et al.

[11] Patent Number: 5,300,595
[45] Date of Patent: Apr. 5, 1994

[54] EPOXY RESIN POWDER COATING COMPOSITION CONTAINING PHYSICAL BLEND OF 2-PHENYLIMIDAZOLINE AND ISOCYANURIC ACID

[75] Inventors: Christian J. C. De Cock; Marianne N. M. Godts, both of Ottignies Louvain-la-Neuve, Belgium; Willem Karzijn, The Hague; Wouter W. Jongepier, Rotterdam/Pernis, both of Netherlands

[73] Assignee: Shell Oil Company, Houston, Tex.

[21] Appl. No.: 892,864

[22] Filed: Jun. 3, 1992

[30] Foreign Application Priority Data

Jun. 5, 1991 [GB] United Kingdom ............... 9112051

[51] Int. Cl.$^5$ ............................................. C08G 59/50
[52] U.S. Cl. ................................. 525/523; 525/524; 525/529; 528/94; 528/118; 528/117
[58] Field of Search ............... 525/523, 524, 529, 118, 525/117; 528/94

[56] References Cited

U.S. PATENT DOCUMENTS

| | | | |
|---|---|---|---|
| 3,896,082 | 7/1975 | Rensmann et al. | 528/117 |
| 4,189,577 | 2/1980 | Sawa et al. | 528/118 |
| 4,933,422 | 6/1990 | Hammer | 528/94 |
| 5,001,212 | 3/1991 | Hammer et al. | 528/94 |
| 5,206,332 | 4/1993 | Hammer et al. | 528/117 |

FOREIGN PATENT DOCUMENTS

| | | |
|---|---|---|
| 493780 | 7/1992 | European Pat. Off. ...... C08G 59/50 |
| 61-218578 | 9/1986 | Japan . |
| 91/08268 | 7/1991 | World Int. Prop. O. . |

*Primary Examiner*—Frederick Krass

[57] ABSTRACT

A thermosetting epoxy resin powder coating composition comprising:
(a) an epoxy resin having at least one 1,2-epoxy group per molecule and
(b) a physical blend of isocyanuric acid and 2-phenylimidazoline.

4 Claims, No Drawings

EPOXY RESIN POWDER COATING COMPOSITION CONTAINING PHYSICAL BLEND OF 2-PHENYLIMIDAZOLINE AND ISOCYANURIC ACID

BACKGROUND OF THE INVENTION

This invention relates to thermosetting epoxy resin powder coating compositions capable of producing a matt finish. Matt finish is defined herein as matt or semi-matt appearance of the cured film. Matt finish films have less than 30% gloss and semi-matt finish films have from 30 to 55% gloss as determined at 60° C. by ASTM D 523.

Use of powder coating compositions is gaining interest in the coatings industry because of their positive environmental and economical aspects. Epoxy resin-based powder coating compositions generally produce glossy or semi-glossy coatings. However, for some applications such as coating a large surface, coatings producing a matt or semi-matt finish are preferred in order to avoid undesirable or unsuitable reflections of light.

U.S. Pat. Nos. 3,947,384 and 4,007,299 disclose the use of curing agents comprising a salt of a polycarboxylic acid having three or more carboxyl groups (such as trimellitic anhydride or pyromellitic acid) and an imidazoline derivative (such as 2-phenylimidazoline), in epoxy resin powder coating compositions which produce a matt finish. Said salts are prepared by dissolving the polycarboxylic acid in a polar aprotic solvent, such as dimethylformamide, dimethylacetamide or N-methylpyrrolidone, and then adding the imidazoline compound in the desired molar ratio, by itself or dissolved or suspended in the same solvent, under stirring at temperatures between room temperature and 100° C. A period of one hour for completion of the salt formation is reported.

Japanese patent application 61,218,578 relates to the use of an imidazoline-isocyanuric acid adduct curing agent in epoxy resin powder coatings and discloses the preparation of the salt of isocyanuric acid and 2-undecylimidazoline by boiling both components in a molar ratio of 1:1 for 5 minutes in water and recovering the formed adduct.

The use of such adducts results in an epoxy-based powder coating which has low reactivity at relatively low cure temperatures.

It is an object of the invention to provide an epoxy resin powder coating composition which has a short cure time at relatively low temperatures and produces a matt or semi-matt finish.

DESCRIPTION OF THE INVENTION

According to the invention, an epoxy resin powder coating composition is provided comprising:
(a) an epoxy resin having at least one 1,2 epoxy group per molecule, and
(b) a physical blend of isocyanuric acid and 2-phenylimidazoline.

It was surprisingly found that the use of the separate chemical compounds (b) and (c) as curing agents in an epoxy resin powder coating composition rather than salts or adducts of these compounds provides a combination of shorter times and a lower level of gloss in the coating, even without the further use of matting agents like (micro) silicic acid and talcum. The level of gloss and the reactivity of the epoxy resin powder coating composition of the invention were found to depend both on the total amount of compounds (b) and (c) in the composition and on their relative amounts.

Best results are obtained with compositions containing 5 to 55% by weight of the 2-phenylimidazoline, preferably 20 to 35%, based on the weight of blend (b), and 2 to 10% by weight of the blend, based on the weight of (a). Use of 2-phenylimidazoline rather than an imidazole compound such as 2-phenylimidazole was found to cause a significantly decrease the gloss level of the cured coatings.

Essentially any epoxy resin having at least one 1,2-epoxy group per molecule, known in the art for use in epoxy resin powder coating formulations, may be used in the curable epoxy resin powder coating composition of the invention. Particularly preferred are 1,2-epoxy compounds having melting ranges which start above 400° C., including higher molecular weight compounds (so-called solid resins) and those which are solid as a result of their symmetrical structure or the size of the carbon systems bound to the 1,2-epoxy groups, as well as those which have been prepared by the reaction of liquid 1,2-epoxy compounds having more than one epoxy group per molecule with primary or secondary amines in such quantity that the adduct contains at least an average of more than one 1,2-epoxy group per molecule (so-called adduct hardeners).

The 1,2-epoxy compounds may be saturated or unsaturated and they may be aliphatic, cycloaliphatic, aromatic or heterocyclic. They may further contain substituents which under the conditions of mixture or upon cure do not cause any undesired side reactions, such as alkyl or aryl substituents, hydroxyl groups and ether groups.

Of the solid resins, 1,2-epoxy compounds having more than one epoxy group per molecule and an epoxy group content (EGC) of between 1000 and 2000 mmol/kg are preferred. These include solid polymeric polyglycidyl polyethers of 2,2-bis(4-hydroxyphenyl)-propane (BPA) which are obtained, for example, by the reaction of BPA with epichlorohydrin in the presence of an alkali hydroxide in the aqueous medium.

Polymeric polyepoxides of this kind may also be obtained through the reaction of a polyglycidyl ether of BPA with less than the equimolar amount of bivalent phenol, preferably in the presence of a catalyst such as a tertiary amine, a tertiary phosphine, or a quaternary phosphonium salt. The polyepoxide may also be a solid epoxidized polyester which has been obtained, for example, through the reaction of a polyvalent alcohol and/or a polybasic carboxylic acid or its anhydride with a low-molecular polyepoxide. Examples of such polyepoxides of low molecular weight are the liquid diglycidyl ether of 2,2-bis(4-hydroxyphenyl)propane, diglycidylphthalate, diglycidyladipate, diglycidyltetrahydrophthalate, diglycidylhexahydrophthalate, diglycidylmaleate and the 3,4-epoxycyclohexylmethylester of 3,4-epoxycyclohexanecarboxylic acid. Commercially available solid epoxy resins manufactured from BPA and epichlorohydrin developed especially for use in powder coatings are EPIKOTE® 3003 (EGC 1212-1397 mmol/kg), EPIKOTE®3004 (EGC 1000-1150 mmol/kg) and EPIKOTEO® 3002 (EGC 1450-1700 mmol/kg).

In order to improve the leveling characteristics of the powder coating, leveling agents may be added during preparation of the powder coating compositions. These agents may be chemical compounds or mixtures of chemical compounds of widely varying chemical structures such as polymeric or monomeric compounds, acetals such as polyvinylbutyral or polyvinylacetobutyral, ethers such as the polymeric polyethyleneglycols and polypropyleneglycols, copolymers of n-butylacrylate and vinylisobutylether, ketone-aldehyde condensation resins, solid silicone resins or mixtures of zinc soaps, of fatty acids and aromatic carboxylic acids. Examples of commercially-available levelling agents are available under the tradenames Modaflow ® and ACRONAL ®. The amount of levelling agent added to powder coating compositions suitably lies in the range of 1.0 to 1.5% by weight, based on the total weight of the epoxy resin powder coating composition.

The powder coating composition may further include other components such as pigments, dyes and fillers in a wide range with respect to the amount of 1,2-epoxy resin compound(s).

In order to prepare the composition of the invention, the isocyanuric acid and the 2-phenylimidazoline can be added separately in either sequence or simultaneously with the epoxy resin. A particularly preferred way to prepare the composition of the invention is to add a physical blend of isocyanuric acid and 2-phenylimidazoline to the epoxy resin. Herein the term "physical blend" is used to indicate that the constituents of the blend have essentially the same chemical structure after blending as before, i.e., the components do not react upon blending.

A physical blend of the curing components can suitably be prepared by blending both components in the desired ratio at room temperature for several minutes using a standard blender and subsequently transforming the blend into a fine powder, a typical particle size being less than 120 microns. This blend is stable and may be stored for some time, typically up to 30 days, before addition of the epoxy resin component. Prior to use, the components of the powder coating composition are intimately mixed, extruded and then crushed. In practice, a particle size of less than 120 microns, more preferably a particle size in the range of from 30 to 100 microns, is applied.

The application of the powder coating composition can be accomplished by known methods such as electrostatic/triboelectric spraying, fluidized bed sintering and electrostatic fluidized bed sintering. After the coating composition is applied to the object to be coated, the latter is heated to a temperature in the range of from 130° C. to 210° C., preferably 140° C. to 200° C., for curing. Curing may be performed in one or more cycles. The curable powder coating composition of the present invention, however, allows exceptionally short cure times, ideally 5 to 10 minutes at temperatures in the range of 160° C. to 200° C.

The invention is further illustrated by means of the following examples.

General description of the methods applied:

1) Preparation of a physical blend

Isocyanuric acid was mixed with 2-phenylimidazoline in the desired ratio, and the mixture was transformed into a fine powder (particle size less than 120 micron), which can be used as such in powder coating formulations.

2) Preparation of a curable powder coating composition

If not otherwise specified, the experiments were performed using the following epoxy resin powder coating formulation:

| Resin | EPIKOTE ® 3003 (EGC 1360 mmol/kg) | 900 g |
|---|---|---|
| Curing compound | variable, but if not specified | 100 g |
| Leveling agent | EPIKOTE ® 3003-4F-10 (EGC 1230 mmol/kg) | 110 g |
| Pigment | TiO$_2$ CL 2310, (ex KRONOS) | 660 g |

The 1,2-epoxy compound was mixed with the desired amount of curing compound, pigment and leveling agent. This "premix" was then extruded at an extrusion temperature of about 930° C. The extrudate was crushed and milled to a fine powder and subsequently sieved to a particle size of less than 100 microns.

3) Application of the powder coating formulation on a steel panel

The powder coating composition was sprayed on a cold rolled steel panel using an electrostatic spray gun. Curing was performed at a temperature of 180° C. for 5 minutes if not specified otherwise. Tests were carried out on films of 50 to 60 microns thickness after 24 hour storage at 3° C. and 70% humidity.

4) Blocking resistance

The physical stability of the powders was determined by the measurement of their resistance to blocking in an air circulated oven at 40° C. for a period of 7 days.

5) Gelation time

The gelation time was measured with a "Coesfeld" geltimer using the following method:

About 0.3 g of the powder coating sample was melted in a small cup which was kept at a temperature of 120, 140, 160, 180 or 2000° C. The time necessary to reach the hard-gel phase in this situation while stirring the molten powder with a wooden stick was recorded. (The hard-gel phase is the condition wherein strings are no longer formed when the wooden stick is pulled out of the stirred mass.) The recorded time is a measure for the reactivity of the system.

6) Gloss values

The gloss values after cure of the powder coating composition were measured according to ASTM D523/DIN 67530 using a reflectometer standardized at 20 and 60 degrees using a semi-gloss reference panel.

EXAMPLE 1

Physical blends of isocyanuric acid and 2-phenylimidazoline in various ratios were prepared and standard epoxy resin powder coating compositions, as defined above, were prepared containing the blends. Gloss and reactivity values of compositions 1 to 7 were determined. Results are presented in Table 1.

TABLE 1

| Composition | 1 | 2 | 3 | 4 | 5 | 6 | 7 |
|---|---|---|---|---|---|---|---|
| 2-phenylimidazoline, % w* | 0 | 15 | 20 | 25 | 28 | 50 | 100 |
| gelation time, at 180° C. (sec.) | no | 34 | 32 | 34 | 31 | 19 | 40 |
| cure time at 180° C. (min.) | no | | | ← 5 → | | | |
| gloss | | | | | | | |

TABLE 1-continued

| Composition | 1 | 2 | 3 | 4 | 5 | 6 | 7 |
|---|---|---|---|---|---|---|---|
| 60° C., % | — | 22 | 17 | 17 | 14 | 25 | 95 |
| 20° C., % | — | 5 | 4 | 4 | 3 | 5 | 82 |

*based on the total weight of isocyanuric acid and 2-phenylimidazoline

From Table 1 it can be seen that the % by weight of 2-phenylimidazoline, based on the total weight of isocyanuric acid and 2-phenylimidazoline, in the composition had a significant impact on gloss and reactivity, with powder coating compositions 2 to 6 performing particularly well.

EXAMPLE 2

Reactivity and gloss of an epoxy resin powder coating composition as described above containing the following curing compounds:

(i) a 1:1 (weight ratio) physical blend of isocyanuric acid and 2-phenylimidazoline.
(ii) a 1:1 (molar) adduct of isocyanuric acid and 2-phenylimidazoline,
(iii) a monosalt trimellitic acid and 2-phenylimidazoline.

Curing compound (ii) was prepared according to the method described in JP 61,218,578, and curing compound iii) was prepared as described in U.S. Pat. No. 3,947,384.

Results are presented in Table 2.

TABLE 2

| Curing compound | Gloss 60° C., % | Gelation time at 180° C. (sec) |
|---|---|---|
| i | 25 | 19 |
| ii | 45 | 40 |
| iii | 19 | 248 |

Table 2 shows the superior performance of the powder coating composition of the invention containing curing compound (i) in terms of reactivity and gloss compared to epoxy resin powder coating compositions containing comparative compounds (ii) or (iii).

EXAMPLE 3

Physical blends of isocyanuric acid (B) and several imidazole compounds in weight ratios of 1:1 were prepared, and standard epoxy resin powder coating compositions as defined above were prepared using such curing compounds. Results of gloss level tests are presented in Table 3.

TABLE 3

| Curing agent | gloss 60° C., % |
|---|---|
| 2-phenylimidazole/B* | 80 |
| bis(2-methyl-N-alkyl-imidazole/B* | 66 |
| 2-phenylimidazoline/B* | 25 |

*B: isocyanuric acid

Table 3 shows that undesirably high gloss levels are obtained when isocyanuric acid/imidazole physical blends are used as curing compounds.

EXAMPLE 4

Epoxy resin powder coating compositions 1 to 6 were prepared by adding a physical blend of isocyanuric acid and 2-phenylimidazoline (compositions 1 to 5) as curing compound or by adding both constituents separately to the formulation (composition 6).

Composition 1 contains 100 g of an isocyanuric acid/2-phenylimidazoline physical blend having a 2-phenylimidazoline content of 30% by weight, based on the total weight of 2-phenylimidazoline and isocyanuric acid.

Composition 2 contains 80 g of the curing compound used in composition 1.

Composition 3 contains 60 g of the curing compound used in composition 1.

Composition 4 contains 80 g of an isocyanuric acid/2-phenylimidazoline blend having a 2-phenylimidazoline content of 15% by weight, based on the total weight of 2-phenylimidazoline and isocyanuric acid.

Composition 5 contains, instead of EPIKOTE ®3003, 900 g of an epoxy resin which is the reaction product of bisphenol A and epichlorohydrin having an EGC of 1594 mmol/kg. Composition 6 contains 56 g of isocyanuric acid and 24 g of 2-phenylimidazoline.

Properties of compositions I to 6 are shown in Table 4.

TABLE 4

| Composition | 1 | 2 | 3 | 4 | 5 | 6 |
|---|---|---|---|---|---|---|
| Gel time (sec) 180° C. | 21 | 25 | 52 | 67 | 61 | 38 |
| Cure time (min) | 8 | 8 | 13 | 8 | 8 | 13 |
| Blocking | no | no | no | no | — | no |
| Gloss | | | | | | |
| 60° C., % | 17 | 24 | 14 | 37 | 16 | 20 |
| 20° C., % | 4 | 5 | 4 | 11 | 4 | 4 |

Table 4 shows the desired low levels of gloss produced by the epoxy resin powder coating composition of the invention.

We claim:

1. A powder coating composition comprising:
   (a) an epoxy resin having at least one 1,2-epoxy group per molecule and (b) from about 2 to about 10 weight percent, based on the weight of component (a), of a physical blend of isocyanuric acid and 2-phenylimidazoline wherein the blend comprises about 5 to about 55 weight percent 2-phenylimidazoline, based on the weight of the blend.

2. The composition of claim 1 comprising 20 to 35% by weight of the 2-phenylimidazoline based on the total weight of said physical blend.

3. The composition of claim 1 wherein (a) comprises a 1,2-epoxy compound having a melting range above 40° C.

4. The composition of claim 1 wherein (a) is a polyglycidyl ether of 2,2-bis(4-hydroxyphenyl)propane having an epoxy group content of from 1000 to 2000 mmol/kg.

* * * * *